(12) United States Patent  
Stephanson

(10) Patent No.: US 9,280,715 B2  
(45) Date of Patent: Mar. 8, 2016

(54) BIOMETRIC DATABASE COLLABORATOR

(71) Applicant: Cory J. Stephanson, La Selva Beach, CA (US)

(72) Inventor: Cory J. Stephanson, La Selva Beach, CA (US)

(*) Notice: Subject to any disclaimer, the term of this patent is extended or adjusted under 35 U.S.C. 154(b) by 268 days.

(21) Appl. No.: 13/842,183

(22) Filed: Mar. 15, 2013

(65) Prior Publication Data

US 2014/0279858 A1 Sep. 18, 2014

(51) Int. Cl.
*G06F 17/00* (2006.01)
*G06K 9/00* (2006.01)
*G06F 21/32* (2013.01)

(52) U.S. Cl.
CPC ............ *G06K 9/00892* (2013.01); *G06F 21/32* (2013.01)

(58) Field of Classification Search
CPC .............................. G06K 9/00892; G06F 21/32
USPC .................................................. 707/609, 758
See application file for complete search history.

(56) References Cited

U.S. PATENT DOCUMENTS

| | | | | |
|---|---|---|---|---|
| 7,225,338 B2* | 5/2007 | Khan | ................ | G06F 17/30247 707/E17.02 |
| 7,542,590 B1* | 6/2009 | Robinson | ........... | G06K 9/00006 382/115 |
| 7,804,982 B2* | 9/2010 | Howard | ............ | G06F 17/30011 382/115 |
| 7,962,467 B2* | 6/2011 | Howard | ............. | G06K 9/00006 707/706 |
| 2003/0212709 A1* | 11/2003 | De Schrijver | ........... | G06F 21/32 707/999.107 |
| 2004/0158723 A1* | 8/2004 | Root | ....................... | G06F 21/32 713/186 |
| 2011/0208611 A1* | 8/2011 | Campbell | .............. | G06Q 10/10 705/26.25 |
| 2012/0169463 A1* | 7/2012 | Shin | .................... | G06F 21/6245 340/5.82 |

OTHER PUBLICATIONS

Authors et. al.: IBM: (http://priorart.ip.com/IPCOM/000016015): Homeland security system Original Publication Date: Aug. 18, 2002.*

* cited by examiner

*Primary Examiner* — Phong Nguyen

(57) ABSTRACT

A biometric database corroborator is disclosed. In one embodiment, a biometric digital representation receiver receives a biometric digital representation representative of an individual. A biometric information gatherer collects biometric data from a first biometric database and at least a second different biometric database. A biometric comparator compares the biometric digital representation representative of the individual with the biometric data gathered from the first biometric database and at least the second different biometric database, the biometric comparator utilizing a predefined match percentage threshold to determine a match. A result provider provides a result from the biometric comparator in a tangible user output.

18 Claims, 5 Drawing Sheets

BIOMETRIC DATABASE COLLABORATOR

TECHNICAL FIELD

The field of the present invention relates to biometric monitoring.

BACKGROUND

Presently a background check is a per-request operation. For example, when a background check is required, fingerprints are taken and sent to one of a number of background checking agencies. The agency returns results in a yes-or-no format; yes—person is in database or no—they are not. If the person is in the database, the database may provide an additional yes or no result, yes—person is flagged or no—person is not flagged.

SUMMARY

A biometric database corroborator is disclosed. In one embodiment, a biometric digital representation receiver receives a biometric digital representation representative of an individual. A biometric information gatherer collects biometric data from a first biometric database and at least a second different biometric database. A biometric comparator compares the biometric digital representation representative of the individual with the biometric data gathered from the first biometric database and at least the second different biometric database, the biometric comparator utilizing a predefined match percentage threshold to determine a match. A result provider provides a result from the biometric comparator in a tangible user output.

Figure 1:
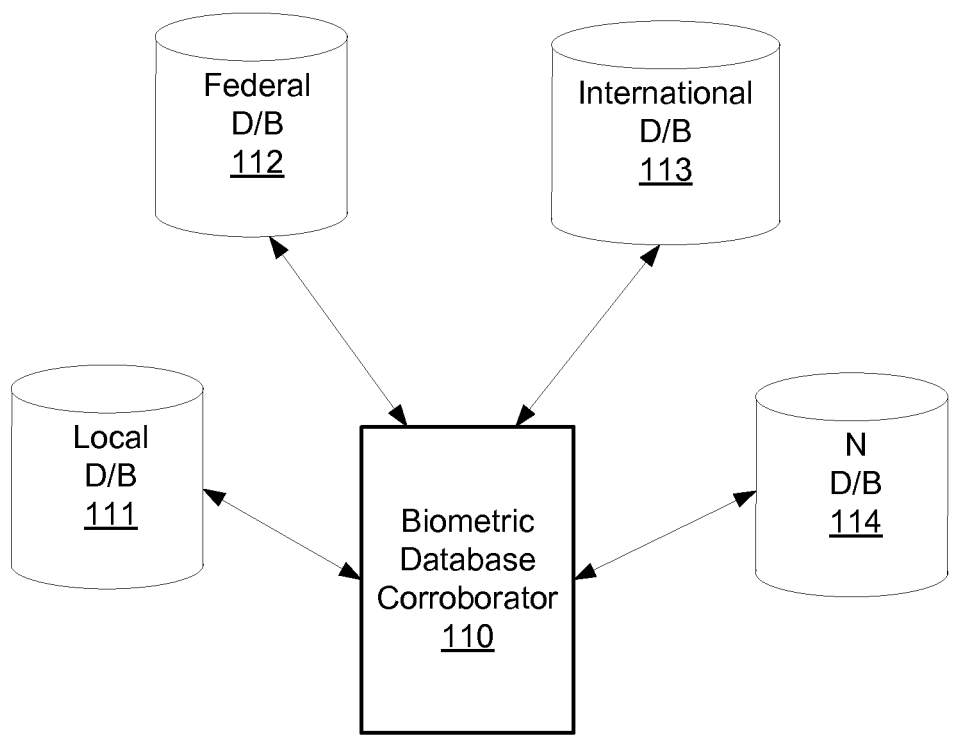
FIG. 1 is a block diagram of a corroborative environment including a plurality of biometric databases shown in accordance with one embodiment of the present technology.

The drawings referred to in this description should be understood as not being drawn to scale except if specifically noted.

DETAILED DESCRIPTION

Reference will now be made in detail to embodiments of the present technology, examples of which are illustrated in the accompanying drawings. While the technology will be described in conjunction with various embodiments, it will be understood that they are not intended to limit the present technology to these embodiments. On the contrary, the presented technology is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Overview

Embodiments herein describe an architecture that provides vetting of an individual's biometrics across a number of different databases. Additionally, the vetting may include strong, weak and partial matches. Moreover, the vetting is user configurable and individually modifiable.

For example, a passport database may not have a person listed at all, while a motor vehicle (DMV) database may have a number of DUI incidents for the same person. Thus, if the passport database were queried, no issues would show up and if no further searches were performed (such as a similar request to the DMV), the individual would be in the clear and no record of the individual's previous indiscretions would be obtained.

Similarly, in a background investigation, an individual may have a record on a local law enforcement (LE) database but not have any record on a federal database. Thus, a search for the individual at the federal level would provide no negative results, while a search of the LE database would return one or more negative results.

In one embodiment, the biometric database corroborator shares any digital representation of a biometric, including raw biometric sensor data, fingerprint digital representations and scans, iris digital representation, palm print, or a hash of the digital representation without requiring access to any additional proprietary formatted data that may be stored in the different databases. As such, the data from the different databases does not need to be correlated or translated before it is utilized. Instead, the biometric database corroborator requests a data file from the existing background databases. The requested data file may include biographic metadata and digital imagery and does not need to include the database proprietary information or a translation of any database proprietary information.

For example, the received biographic metadata may be in a text format and may include information such as: any names, aliases, present address, previous address, driver's license number, social security number, passport information, or other personal information that has been stored with the individual's file.

The biometric data will be a digital representation of the biometric identification method used. For example, the biometric information may include any digital or received biometric sensor input, such as, one or more of the individual's finger prints, iris, palm print, a digital representation of the individual's face or other biometric data stored in the database.

In general, the digital representation may include 2-dimensional and 3-dimensional imagery such as: joint photographic experts group (JPEG), JPEG 2000, JPEG file interchange format (JFIF), exchangeable image file format (Exif), tagged image file format (TIFF), raw image formats (RAW), digital negative (DNG), graphics interchange format (GIF), bitmap file format (BMP), portable network graphics (PNG), portable pixmap file format (PPM), portable graymap file format (PGM), portable bitmap file format (PBM), portable arbitrary format (PAM), WebP, high dynamic range (HDR), computer graphics metafile (CGM), scalable vector graphics (SVG), Wavelet Scalar Quantitization (WSQ) and the like.

With reference now to FIG. 1, a block diagram 100 of a corroborative environment including a plurality of biometric databases is shown in accordance with one embodiment of the present technology. FIG. 1 includes a local database 111, a federal database 112, an international database 113 and an n database 114. FIG. 1 also includes biometric database corroborator 110. Although only 4 different databases are shown, they are provided for clarity in the following discussion. The actual number of databases accessed by biometric database corroborator 110 may include more or fewer databases. Moreover, biometric database corroborator 110 may access a plurality of local, federal, international or n biometric databases.

In general, local database 111 may be a biometric database that is maintained for a localized area. In one embodiment, local database 111 may be a county law enforcement database that maintains biometric information on criminals as well as biometric information collected from crime scenes. For example, the local database 111 may be maintained by county or state law enforcement.

Federal database 112 is a representation of a biometric database that is maintained for a country. In one embodiment, federal database 112 may be a federal law enforcement database that maintains biometric information on criminals as well as biometric information collected from crime scenes. For example, federal database 112 may be maintained by the Federal Bureau of Investigation, Fish and Game, and the like.

International database 113 is a representation of a biometric database that is maintained for a different country or collection of countries. In one embodiment, international database 113 may be an international law enforcement database that maintains biometric information on criminals as well as biometric information collected from crime scenes. For example, international database 113 may be maintained by the Central Intelligence Agency, Interpol, and the like.

N database 114 is a representation of a biometric database that is maintained for another entity. In one embodiment, n database 114 may be a private company database that maintains biometric information on employees, associates, or the like.

Figure 2:
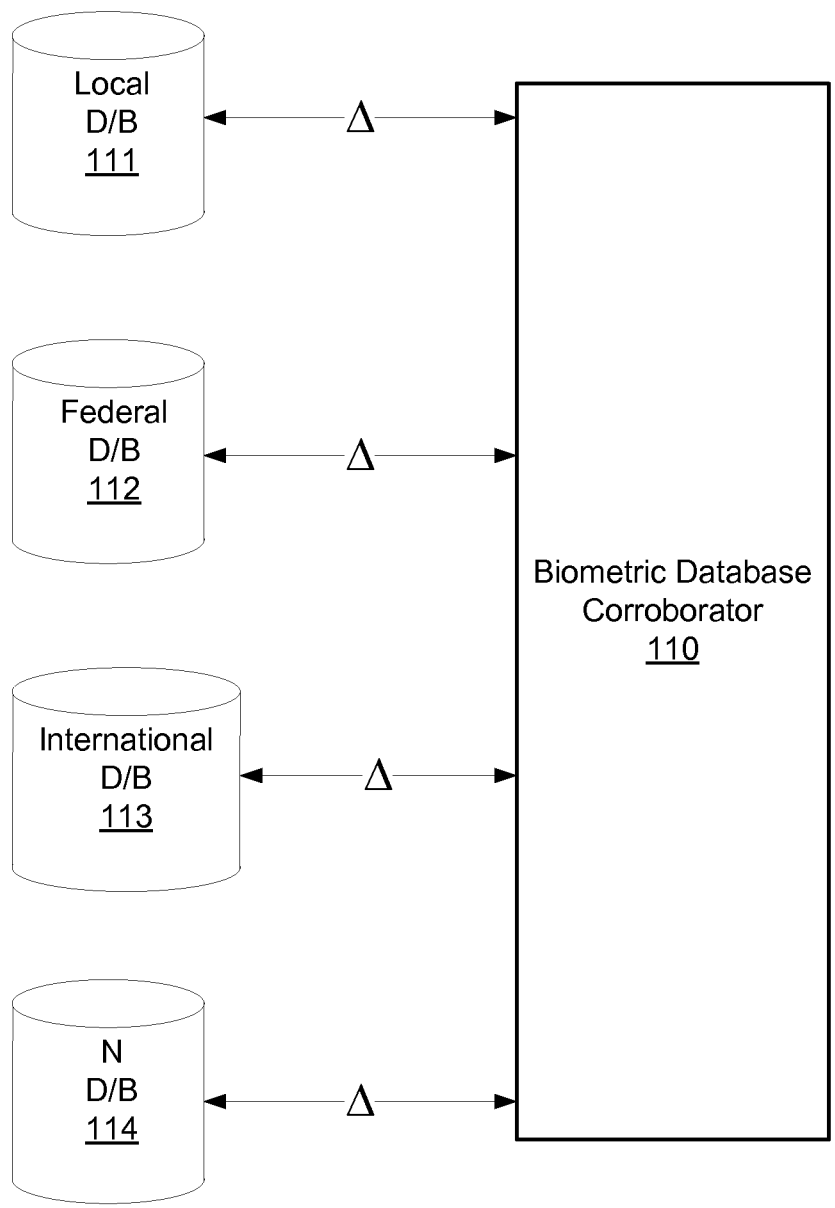
FIG. 2 is a block diagram of a corroborative environment including a plurality of biometric databases sharing the changing information (Δ) shown in accordance with one embodiment of the present technology.

With reference now to FIG. 2, a block diagram of a corroborative environment 200 including a plurality of biometric databases sharing the changing information (Δ) is shown in accordance with one embodiment of the present technology. In general, the databases 111-114 of FIG. 2 are similar to those described in FIG. 1. However, in FIG. 2, the biometric database corroborator 110 is only receiving change information (Δ) from each of the biometric databases.

Figure 3:
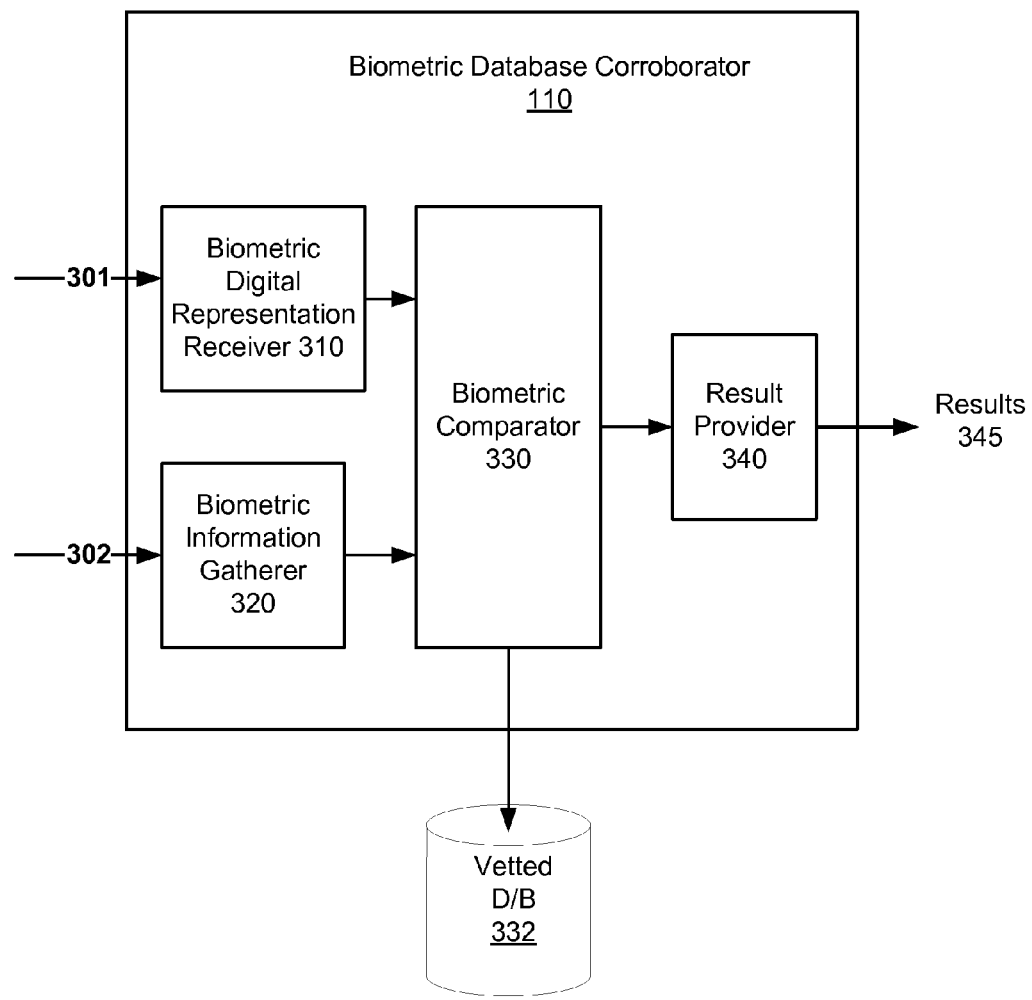
FIG. 3 is a block diagram of a biometric database corroborator shown in accordance with one embodiment of the present technology.

With reference now to FIG. 3, a block diagram of a biometric database corroborator 110 shown in accordance with one embodiment of the present technology. In one embodiment, biometric database corroborator 110 includes a biometric image receiver 310, a biometric information gatherer 320, a biometric comparator 330 and a result provider 340.

In general, biometric digital representation receiver 310 receives a biometric digital representation 301 representative of an individual. For example, the biometric digital representation may be a digital representation of a fingerprint digital representation, an iris digital representation, a palm print digital representation, a facial digital representation or another individually identifiable biometric.

Biometric information gatherer 320 collects biometric data 302 from a first biometric database and at least a second different biometric database such as databases 111-114 of FIGS. 1 and 2. In general, the first database of biometric digital representations does not interact directly with the second different database of biometric digital representations. For example, the two or more databases may be supported by different agencies, different countries, or the like and may have different layouts, information fields, proprietary code or the like.

In one embodiment, biometric information gatherer 320 also collects biographic metadata in conjunction with the biometric data from the first biometric database and at least the second different biometric database. In one embodiment, the biographic metadata includes information such as, but not limited to, a name(s), an alias, a present address, a previous address, a driver's license number, a social security number, and passport information.

Biometric comparator 330 compares the biometric digital representation 301 representative of the individual with the digital biometric data 302 gathered from the first biometric database and at least the second different biometric database. As described in more detail herein, biometric comparator 330 utilizes a predefined match percentage threshold to determine a match. For example, the match can be a high percentage match, e.g., 90-100%; a low percentage match, e.g., 40%; a partial match or the like. Moreover, the predefined match percentage threshold is adjustable. For example, the match percentage threshold could be adjusted to increase the accuracy of the biometric comparator 330.

In one embodiment, biometric database corroborator 110 includes a vetted database 332. In general, the vetted database 332 refers to a database of individuals that have been fully vetted by the biometric database corroborator 110. In one embodiment, the vetted database 332 may contain a trusted individual's database. That is, during the vetting process the individuals did not have any bad records turn up in any of the searched databases. Similarly, the vetted database 332 may contain a non-trusted individual's database. For example, during the vetting process the individuals did have bad or questionable records turn up from one or more of the searched databases. In one embodiment, the trusted and non-trusted databases may be stored on different databases 332, in different locations on database 332, or the like.

In one embodiment, the biometric information for the individual is added to vetted database 332 based on the results from biometric comparator 330. From that point, biometric comparator 330 compares the biometric information for the individual in the vetted database with any changes (Δ) in biometric information made to the first database and at least the second different database.

Result provider 340 provides results 345 from the biometric comparator 330 in a tangible user output. For example, the results 345 may be provided in a printout, or on a graphical user interface (GUI).

Figure 4:
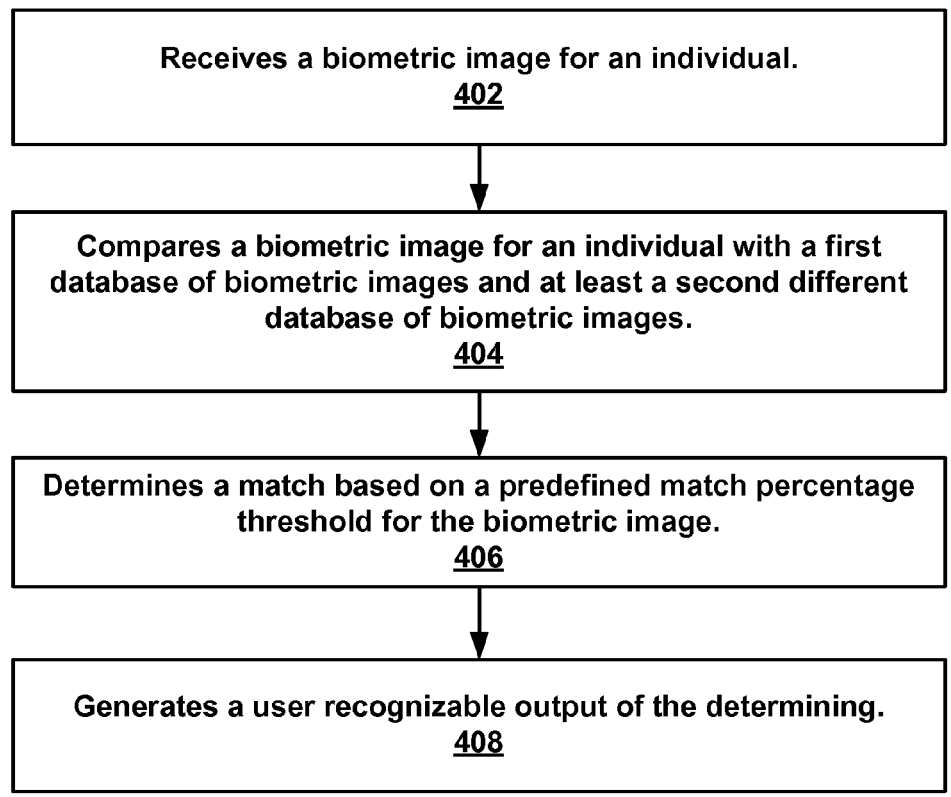
FIG. 4 is a flowchart of a computer-implemented method for biometric database corroboration shown in accordance with one embodiment of the present technology.

With reference now to FIG. 4, a flowchart 400 of a computer-implemented method for assessing a detected event is shown in accordance with one embodiment.

At 402 of FIG. 4, one embodiment receives digital biometric information for an individual. As stated herein, the digital biometric information may include a fingerprint image, an iris image, a palm print image, a facial image or the like.

In another embodiment, the individual's digital biometric information may be an adaptively updated biometric digital representation. That is, an amalgamated biometric digital representation may be generated by comparing a plurality of the individual's related biometric digital representations. For example, if a new set of the individual's fingerprints are recorded, the biometric database reviewer does not replace the oldest set with the newest set. Instead, the two sets of fingerprints are amalgamated into a biometric data set representing the individual's learned fingerprints. Thus, a new scar in one of the fingerprints would be included in the biometric data. In so doing, an old fingerprint would still match the individual's biometric file. That is, the biometric database reviewer would be able to utilize the amalgamated fingerprint data to match fingerprints against both pre-scar fingerprints and post-scar fingerprints.

With reference now to 404 of FIG. 4 and to FIGS. 1-3, one embodiment compares a biometric digital representation for an individual with a first database of biometric digital representations and at least a second different database of biometric digital representations. In one embodiment, the first database of biometric digital representations does not interact with the at least the second different database of biometric digital representations. For example, the two or more databases may be supported by different agencies, or different countries, and may have different layouts, information fields, proprietary codes or the like.

Referring now to 406 of FIG. 4, one embodiment determines a match based on a predefined match percentage threshold for the biometric digital representation. In one embodiment, the match correlation between the records can be adjusted based on the desired level of accuracy. For example, an individual being vetted for a job at the local animal shelter would be vetted at a first level while an individual being vetted for a job at the White House would be vetted at a much higher level.

In the case of the animal shelter worker, the biometric repository may only provide results that are 95-100% match. However, in the case of the White House worker, the biometric repository search may provide results that include 50% matches, or the like. Thus, the biometric repository search for a less sensitive position would be a relatively quicker process than a similar biometric repository search for an individual being vetted for a more trusted position.

With reference now to 408 of FIG. 4, one embodiment generates a user recognizable output of the determining. For example, the output may be an response about any matches, partial matches or the like. If matches are found the individual can be further vetted. If no matches are found, the individual may be added to a vetted database.

Vetted Database

In one embodiment, the database is filled with the information for a set of specific individuals. As an individual is added to the database, the individual's fingerprints (or other biometric data) are compared to any files from one or more other databases (e.g., federal database, passport database, DMV database, local LE database, etc.). Once the individual's biometric information has been compared to all files on the provided databases, the individual is determined to either match an existing file or not. As long as nothing disqualifying is found, the individual's status is that of a trusted or "good guy".

However, once the individuals are vetted and established in the "good guy" database, the file does not become stagnant until another background review is requested. For example, it may be a present policy that the individual's background is reviewed every one year, five years, etc.

In contrast, the present biometric repository provides a continuous monitoring of the databases initially searched for any new information added to one or more of the databases. For example, in the initial background search, all files in the federal database were searched. This is a large process that could take quite a bit of computational time. For example, if the federal database had 500 million files the initial search would include a comparison of the 500 million files.

However, once an individual had completed the initial background and was included in the "good guy" list, the 500 million records in the federal database would become normalized. That is, there would not need to be a second search of the same 500 million files to again vet the individual. Only new or changed files would need to be monitored. For example, if 150 files are added or modified per day, only those 150 files would need to be reviewed.

Therefore, to maintain real-time or near-real time vetting, in one embodiment, when new data is added to the federal database, the new information is compared to all of the files in the biometric repository. If any new information correlates to any of the "good guys" the individual's file would be flagged for further review.

In one embodiment, the matching is change-in-system to persons; not person-in-system to changes. In other words, instead of selecting an individual and then comparing the individual's biometric to the new information, the present technology takes the new information and compares it to every biometric in the vetted database. For example, if a partial fingerprint is added to the system, the partial fingerprint is compared to all individuals in the biometric database.

Thus, instead of having to perform a number of different searches to see if the partial fingerprint is Jay's, Mike's or Courtney's, the biometric database reviewer will receive the partial fingerprint and compare it to all of the individuals in the database and then provide any resulting matches. Such as, for example, the partial fingerprint is an 85% match to Christine, a 65% match to Ed, etc.

In another embodiment, the "good guy" list could be vetted at weekly, monthly or any other length intervals. As stated herein, the vetting would only require the review of any new or modified data that had been added to the monitored databases since the previous review.

Similarly, a "bad guy" database could be established. For example, the "bad guy" database may include individuals that have been identified as a specific or particular threat. In general, each individual would be added to the "bad guy" database in the same manner as the "good guys". That is, the entire database of records is searched for any files that match the biometric information for the individual. Once the records have been searched, then any changes that occur over the monitored databases would be compared to the "bad guy" list. Any records that are correlated within the specified match criteria would be flagged for review, added to the individual's record, or the like.

In one embodiment, the "good guy" database and "bad guy" databases may be maintained in separate physical or virtual environments. In another embodiment, once the initial search has been conducted the files received from the other databases may be kept or may be purged. For example, the 500 million federal records that were received may be stored in the database for later review, such as when vetting a new individual. However, in another embodiment, the information may be purged from the system. That is, since the records have been searched and the individuals within the database have been vetted with respect to the 500 million files; the files can be discarded since the biometric database searcher will then only receive and monitor changes that occur at the other databases.

Access Control

In one embodiment, once the individual is vetted and placed on the good guy list the individual may be provided with an access card. The access card may be used to access buildings, military bases, secure areas, and the like. As long as no records of bad deeds are correlated to the individual, the individual's access card will be active. However, if an individual is matched with a record from a bad deed entered into one of the databases, the access card may be suspended or even used to find the individual's location.

For example, assume a fingerprint is recovered from the scene of a crime and added to the federal database (e.g., the biometric fingerprint along with the biographical data about the bad deed). When the biometric database reviewer receives the new information from the federal database, it compares the biometric fingerprint to the fingerprints of all of the different individuals that are maintained in the vetted database. If an individual's file on the good guy list is flagged as matching the recovered fingerprint (within the prescribed match criteria) the individual's trusted status will be reviewed. Depending upon the severity of the crime, or other criteria a number of responses may be provided. In one embodiment, the individual's access card can be blocked or otherwise denied; or when the individual next attempts to utilize the access card, the individual may be routed to a holding location for further processing, or the like. In so doing, the present technology can be utilized to quickly recognize and flag a trusted individual that begins acting improperly before additional damage can be inflicted.

Example Computing System

Figure 5:
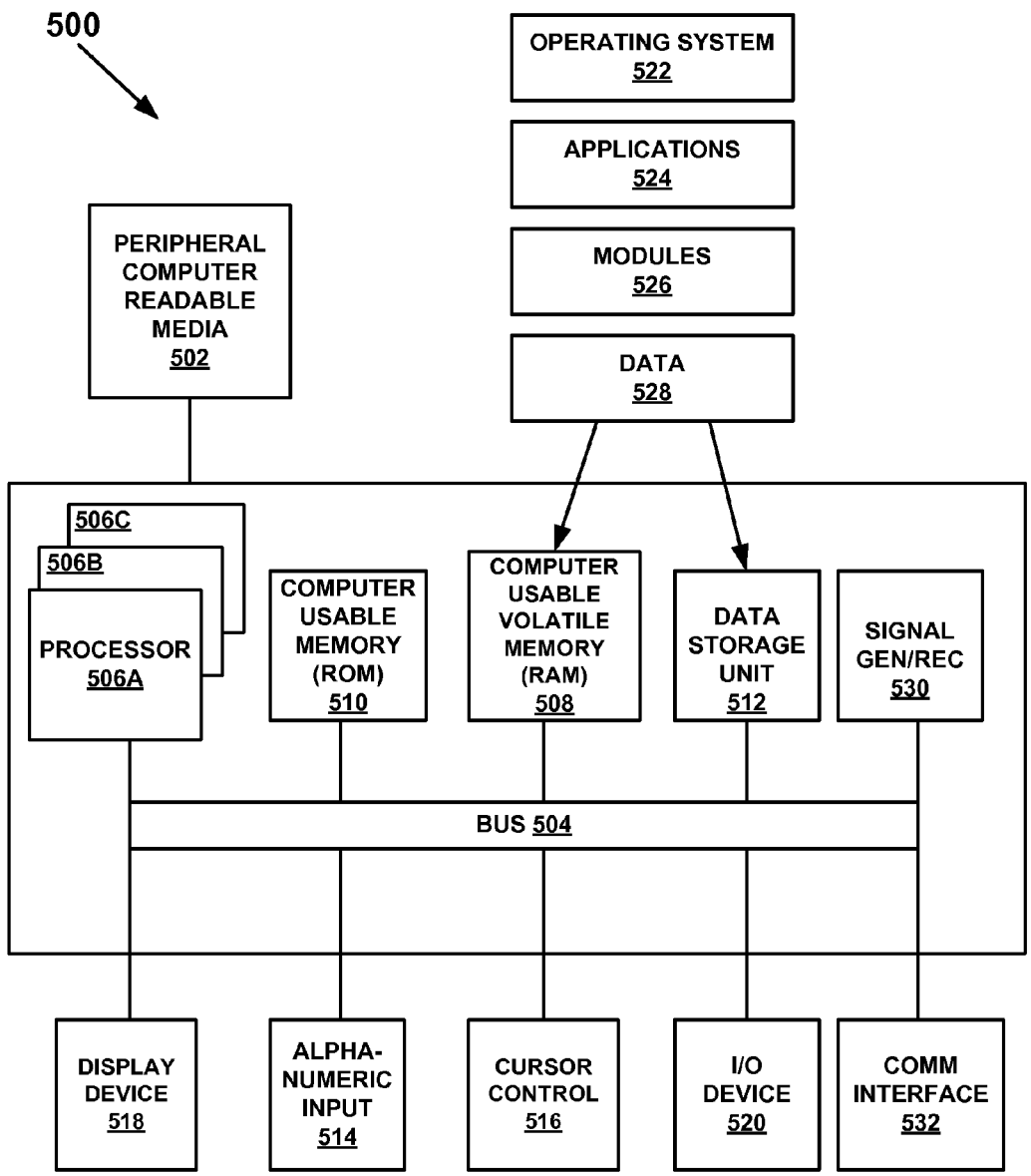
FIG. 5 is a block diagram of an exemplary computer system in accordance with one embodiment of the present technology.

With reference now to FIG. 5, portions of the technology for providing a communication composed of computer-readable and computer-executable instructions that reside, for example, in non-transitory computer-usable storage media of a computer system. That is, FIG. 5 illustrates one example of a type of computer that can be used to implement embodiments of the present technology. FIG. 5 represents a system or components that may be used in conjunction with aspects of the present technology. In one embodiment, some or all of the components of FIG. 1 or FIG. 3 may be combined with some or all of the components of FIG. 5 to practice the present technology.

FIG. 5 illustrates an example computer system 500 used in accordance with embodiments of the present technology. It is appreciated that system 500 of FIG. 5 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 5, computer system 500 of FIG. 5 is well adapted to having peripheral computer readable media 502 such as, for example, a flash drive, a compact disc, and the like coupled thereto.

System 500 of FIG. 5 includes an address/data bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. System 500 also includes data storage features such as a computer usable volatile memory 508, e.g. random access memory (RAM), coupled to bus 504 for storing information and instructions for processors 506A, 506B, and 506C.

System 500 also includes computer usable non-volatile memory 510, e.g. read only memory (ROM), coupled to bus 504 for storing static information and instructions for processors 506A, 506B, and 506C. Also present in system 500 is a data storage unit 512 (e.g., a magnetic or optical disk and disk drive) coupled to bus 504 for storing information and instructions. System 500 also includes an optional alpha-numeric input device 514 including alphanumeric and function keys coupled to bus 504 for communicating information and command selections to processor 506A or processors 506A, 506B, and 506C. System 500 also includes an optional cursor control device 516 coupled to bus 504 for communicating user input information and command selections to processor 506A or processors 506A, 506B, and 506C. System 500 of the present embodiment also includes an optional display device 518 coupled to bus 504 for displaying information.

Referring still to FIG. 5, optional display device 518 of FIG. 5 may be a liquid crystal device, cathode ray tube, plasma display device or other display device suitable for creating graphic images and alpha-numeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick or special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

System 500 is also well suited to having a cursor directed by other means such as, for example, voice commands. System 500 also includes an I/O device 520 for coupling system 500 with external entities. For example, in one embodiment, I/O device 520 is a modem for enabling wired or wireless communications between system 500 and an external network such as, but not limited to, the Internet. A more detailed discussion of the present technology is found below.

Referring still to FIG. 5, various other components are depicted for system 500. Specifically, when present, an operating system 522, applications 524, modules 526, and data 528 are shown as typically residing in one or some combination of computer usable volatile memory 508, e.g. random access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the internet. In one embodiment, the present technology, for example, is stored as an application 524 or module 526 in memory locations within RAM 508 and memory areas within data storage unit 512.

System 500 also includes one or more signal generating and receiving device(s) 530 coupled with bus 504 for enabling system 500 to interface with other electronic devices and computer systems. Signal generating and receiving device(s) 530 of the present embodiment may include wired serial adaptors, modems, and network adaptors, wireless modems, and wireless network adaptors, and other such communication technology. The signal generating and receiving device(s) 530 may work in conjunction with one or more communication interface(s) 532 for coupling information to and/or from system 500. Communication interface 532 may include a serial port, parallel port, Universal Serial Bus (USB), Ethernet port, antenna, or other input/output interface. Communication interface 532 may physically, electrically, optically, or wirelessly (e.g. via radio frequency) couple system 500 with another device, such as a cellular telephone, radio, or computer system.

The computing system 500 is only one example of a suitable computing environment and is not intended to suggest any limitation as to the scope of use or functionality of the present technology. Neither should the computing environment 500 be interpreted as having any dependency or requirement relating to any one or combination of components illustrated in the example computing system 500.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

It should be further understood that the examples and embodiments pertaining to the systems and methods disclosed herein are not meant to limit the possible implementations of the present technology. Further, although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for corroborating biometric data from a plurality of databases, the method comprising:
    receiving, at the computing device, a biometric digital representation for an individual;
    comparing, at the computing device, a biometric digital representation for an individual with a first database of biometric digital representations and at least a second different database of biometric digital representations;
    determining, at the computing device, a match based on a predefined match percentage threshold for the biometric digital representation;
    comparing, at the computing device, the biometric digital representation for the individual with any changes in biometric information made to the first database and at least the second different database;
    updating the determining of the match based on the changes in biometric information; and
    generating, at the computing device, a user recognizable output of the determining.

2. The computer-implemented method of claim 1 wherein the biometric digital representation is selected from the group consisting of: a biometric sensor data stream, fingerprint digital representation, an iris digital representation, a palm print digital representation and a facial digital representation.

3. The computer-implemented method of claim 1 wherein the first database of biometric digital representations does not interact with the at least the second different database of biometric digital representations.

4. The computer-implemented method of claim 1 further comprising:
    adjusting the predefined match percentage threshold to increase the accuracy of the determining.

5. The computer-implemented method of claim 1 further comprising:
    adding the biometric information for the individual to a vetted database for trusted individuals.

6. The computer-implemented method of claim 1 further comprising:
    adding the biometric information for the individual to a vetted database for untrusted individuals.

7. The computer-implemented method of claim 1 further comprising:
    adaptively updating the individual's biometric digital representation by coupling an individual's updated biometric digital representation with an individual's prior biometric digital representation to provide an amalgamated biometric digital representation.

8. A biometric database corroborator stored on a non-transitory computer-usable storage media, said biometric database corroborator comprising:
    a biometric digital representation receiver to receive a biometric digital representation representative of an individual;
    a biometric information gatherer to collect biometric data from a first biometric database and at least a second different biometric database;
    a biometric comparator to compare the biometric digital representation representative of the individual with the biometric data gathered from the first biometric database and at least the second different biometric database, the biometric comparator utilizing a predefined match percentage threshold to determine a match;
    a vetted database to receive the biometric information for the individual; and
    a result provider to provide a result from the biometric comparator in a tangible user output,
    wherein the biometric comparator compares the biometric information for the individual in the vetted database with any changes in biometric information made to the first database and at least the second different database, and wherein the vetted database updates the determining of the match based on the changes in biometric information.

9. The biometric database corroborator of claim 8, wherein the biometric digital representation is selected from the group consisting of: a fingerprint digital representation, an iris digital representation, a palm print digital representation, a facial digital representation, or other biometric digital representation of an individual.

10. The biometric database corroborator of claim 8, wherein the first database of biometric digital representations does not interact with the at least the second different database of biometric digital representations.

11. The biometric database corroborator of claim 8, wherein the predefined match percentage threshold is adjustable to increase the accuracy of the biometric comparator.

12. The biometric database corroborator of claim 8, wherein the biometric information gatherer collects biographic metadata in conjunction with the biometric data from the first biometric database and at least the second different biometric database.

13. The biometric database corroborator of claim 12, wherein the biographic metadata is selected from the group of information consisting of: a name(s), an alias, a present address, a previous address, a driver's license number, a social security number, and passport information.

14. The biometric database corroborator of claim 8, wherein the biometric comparator provides matches from the group consisting of: a high percentage match, a low percentage match, and a partial match.

15. Instructions on a non-transitory computer-usable medium wherein the instructions when executed cause a computer system to perform a method for assessing a detected event, the method comprising:

accessing, at the computing device, a first database of biometric digital representations;

comparing, at the computing device, a biometric digital representation for an individual with the first database of biometric digital representations;

accessing, at the computing device, at least a second database of biometric digital representations;

comparing, at the computing device, the biometric digital representation for the individual with at least the second database of biometric digital representations;

determining, at the computing device, a match based on a predefined match percentage threshold for the biometric digital representation;

comparing, at the computing device, the biometric digital representation for the individual with any changes in biometric information made to the first database and at least the second different database;

updating the determining of the match based on the changes in biometric information; and generating, at the computing device, a user recognizable output of the determining.

16. The non-transitory computer-usable medium of claim 15 further comprising:

adding the biometric information for the individual to a vetted database.

17. The non-transitory computer-usable medium of claim 15 receiving, at the computing device, an updated biometric digital representation for the individual;

adaptively updating, at the computing device, the individual's biometric digital representation with the updated biometric digital representation to provide an amalgamated biometric digital representation; and comparing, at the computing device, the amalgamated biometric digital representation for the individual with a first database of biometric digital representations and at least a second different database of biometric digital representations.

18. The non-transitory computer-usable medium of claim 15 wherein the match is selected from the group consisting of: a high percentage match, a low percentage match, and a partial match.

* * * * *